(12) United States Patent
Gariepy et al.

(10) Patent No.: US 12,298,146 B2
(45) Date of Patent: May 13, 2025

(54) STAND-ALONE SELF-DRIVING MATERIAL-TRANSPORT VEHICLE

(71) Applicant: Clearpath Robotics Inc., Kitchener (CA)

(72) Inventors: Ryan Christopher Gariepy, Kitchener (CA); Jason Scharlach, Kitchener (CA); Andrew Clifford Blakey, Kitchener (CA); Simon Drexler, Kitchener (CA); James Dustin Servos, Kitchener (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 92 days.

(21) Appl. No.: 17/864,623

(22) Filed: Jul. 14, 2022

(65) Prior Publication Data

US 2022/0357174 A1 Nov. 10, 2022

Related U.S. Application Data

(63) Continuation of application No. 16/539,249, filed on Aug. 13, 2019, now abandoned, which is a
(Continued)

(51) Int. Cl.
*G01C 21/36* (2006.01)
*G01C 21/00* (2006.01)
(Continued)

(52) U.S. Cl.
CPC ..... *G01C 21/3626* (2013.01); *G01C 21/3885* (2020.08); *G05D 1/0027* (2013.01);
(Continued)

(58) Field of Classification Search
CPC ............ G01C 21/3626; G01C 21/3885; G01C 21/3461; G01C 21/3614; G05D 1/0027;
(Continued)

(56) References Cited

U.S. PATENT DOCUMENTS 5,023,790 A 6/1991 Luke, Jr.
6,315,513 B1 11/2001 Harukawa et al.
(Continued)

FOREIGN PATENT DOCUMENTS

CA 2762743 A1 6/2012
CN 109187063 A 1/2019
(Continued)

OTHER PUBLICATIONS

Shneier et al., "Literature Review of Mobile Robots for Manufacturing", May 2015, NIST. (Year: 2015).
(Continued)

*Primary Examiner* — Bao Long T Nguyen

(57) ABSTRACT

Systems and methods for a stand-alone self-driving material-transport vehicle are provided. A method includes: displaying a graphical map on a graphical user-interface device based on a map stored in a storage medium of the vehicle, receiving a navigation instruction based on the graphical map, and navigating the vehicle based on the navigation instruction. As the vehicle navigates, it senses features of an industrial facility using its sensor system, and locates the features relative to the map. Subsequently, the vehicle stores the updated map including the feature on the vehicle's storage medium. The map can then be shared with other vehicles or a fleet-management system.

18 Claims, 8 Drawing Sheets

Related U.S. Application Data continuation of application No. PCT/CA2018/050464, filed on Apr. 18, 2018.

(60) Provisional application No. 62/486,936, filed on Apr. 18, 2017.

(51) Int. Cl.
    *G05D 1/00* (2024.01)
    *G06Q 10/08* (2023.01)

(52) U.S. Cl.
    CPC .............. *G05D 1/0088* (2013.01); *G05D 1/02* (2013.01); *G06Q 10/08* (2013.01)

(58) Field of Classification Search
    CPC ...... G05D 1/0088; G05D 1/02; G05D 1/0297; G05D 1/0274; G05D 1/0011; G05D 1/0221; G05D 1/0061; G05D 1/0219; G06Q 10/08
    See application file for complete search history.

(56) References Cited

U.S. PATENT DOCUMENTS

| | | |
|---|---|---|
| 6,463,360 B1 | 10/2002 | Terada et al. |
| 7,693,757 B2 | 4/2010 | Zimmerman |
| 8,190,295 B1 | 5/2012 | Garretson et al. |
| 8,634,981 B1 | 1/2014 | Hyde et al. |
| 8,694,193 B2 | 4/2014 | Mäkelä et al. |
| 9,114,440 B1 | 8/2015 | Colucci |
| 9,280,153 B1 | 3/2016 | Palamarchuk et al. |
| 9,351,569 B1 | 5/2016 | Lucey et al. |
| 9,358,975 B1 | 6/2016 | Watts |
| 9,465,388 B1 | 10/2016 | Fairfield et al. |
| 9,486,917 B2 | 11/2016 | Reid et al. |
| 9,487,356 B1 | 11/2016 | Aggarwal |
| 9,557,738 B2* | 1/2017 | Enke ................ G08G 5/0091 |
| 9,632,502 B1 | 4/2017 | Levinson et al. |
| 9,733,646 B1 | 8/2017 | Nusser |
| 9,928,749 B2 | 3/2018 | Gil et al. |
| RE47,108 E | 10/2018 | Jacobus et al. |
| 10,112,771 B2 | 10/2018 | D'Andrea et al. |
| 10,317,119 B2 | 6/2019 | Zou |
| 10,328,769 B2 | 6/2019 | Ferguson et al. |
| 10,577,199 B2 | 3/2020 | Lee et al. |
| 11,167,964 B2 | 11/2021 | Gariepy et al. |
| 11,263,579 B1 | 3/2022 | Siegel |
| 2002/0154974 A1 | 10/2002 | Fukuda et al. |
| 2004/0158355 A1 | 8/2004 | Holmqvist et al. |
| 2005/0216126 A1 | 9/2005 | Koselka et al. |
| 2007/0106306 A1 | 5/2007 | Bodduluri et al. |
| 2007/0294029 A1 | 12/2007 | D'Andrea et al. |
| 2008/0183599 A1 | 7/2008 | Hill et al. |
| 2009/0012667 A1 | 1/2009 | Matsumoto et al. |
| 2009/0043440 A1 | 2/2009 | Matsukawa et al. |
| 2010/0021272 A1 | 1/2010 | Ward et al. |
| 2010/0030417 A1 | 2/2010 | Fang et al. |
| 2010/0030466 A1 | 2/2010 | Rogers et al. |
| 2010/0049391 A1 | 2/2010 | Nakano |
| 2010/0063680 A1 | 3/2010 | Tolstedt et al. |
| 2010/0106356 A1* | 4/2010 | Trepagnier ........... G05D 1/0214 701/25 |
| 2010/0206651 A1 | 8/2010 | Nagasaka |
| 2010/0316470 A1 | 12/2010 | Lert et al. |
| 2010/0321489 A1 | 12/2010 | Chen et al. |
| 2012/0121161 A1 | 5/2012 | Eade et al. |
| 2012/0173018 A1* | 7/2012 | Allen ................ B25J 11/008 700/245 |
| 2012/0197464 A1 | 8/2012 | Wang et al. |
| 2012/0296471 A1 | 11/2012 | Inaba et al. |
| 2013/0054129 A1 | 2/2013 | Wong et al. |
| 2013/0054133 A1 | 2/2013 | Lewis et al. |
| 2013/0086215 A1 | 4/2013 | Trotta et al. |
| 2013/0226340 A1 | 8/2013 | Buchstab |
| 2013/0231779 A1 | 9/2013 | Purkayastha et al. |
| 2014/0002439 A1 | 1/2014 | Lynch |
| 2014/0040431 A1 | 2/2014 | Rao et al. |
| 2014/0188324 A1 | 7/2014 | Waltz et al. |
| 2014/0229004 A1* | 8/2014 | Dooley .................. B25J 9/0084 700/248 |
| 2014/0244004 A1 | 8/2014 | Scott et al. |
| 2014/0277691 A1 | 9/2014 | Jacobus |
| 2014/0309833 A1* | 10/2014 | Ferguson ............. G06V 20/588 701/23 |
| 2014/0350725 A1 | 11/2014 | LaFary et al. |
| 2014/0365113 A1 | 12/2014 | Mcgavran et al. |
| 2014/0365258 A1 | 12/2014 | Vestal et al. |
| 2015/0032252 A1 | 1/2015 | Galluzzo et al. |
| 2015/0088310 A1* | 3/2015 | Pinter .................... B25J 9/1676 901/1 |
| 2015/0197009 A1 | 7/2015 | Melikian |
| 2015/0217455 A1 | 8/2015 | Kikkeri et al. |
| 2015/0248131 A1 | 9/2015 | Fairfield et al. |
| 2015/0309485 A1 | 10/2015 | Nishi |
| 2015/0343638 A1 | 12/2015 | Mattern et al. |
| 2015/0352721 A1 | 12/2015 | Wicks et al. |
| 2016/0005229 A1 | 1/2016 | Lee et al. |
| 2016/0086494 A1 | 3/2016 | Anandayuvaraj et al. |
| 2016/0101940 A1 | 4/2016 | Grinnell et al. |
| 2016/0246301 A1 | 8/2016 | Kazama et al. |
| 2016/0271800 A1 | 9/2016 | Stubbs et al. |
| 2016/0327951 A1 | 11/2016 | Walton et al. |
| 2017/0039765 A1 | 2/2017 | Zhou et al. |
| 2017/0100837 A1 | 4/2017 | Zevenbergen et al. |
| 2017/0113352 A1 | 4/2017 | Lutz et al. |
| 2017/0116477 A1 | 4/2017 | Chen et al. |
| 2017/0122749 A1 | 5/2017 | Urano et al. |
| 2017/0168488 A1* | 6/2017 | Wierzynski .......... G05D 1/0212 |
| 2017/0308096 A1 | 10/2017 | Nusser et al. |
| 2017/0341236 A1 | 11/2017 | Patrick et al. |
| 2017/0351261 A1 | 12/2017 | Levinson et al. |
| 2018/0001474 A1 | 1/2018 | Sinyavskiy et al. |
| 2018/0009000 A1 | 1/2018 | Shang et al. |
| 2018/0058861 A1 | 3/2018 | Doria et al. |
| 2018/0060765 A1 | 3/2018 | Hance et al. |
| 2018/0086575 A1 | 3/2018 | Mccarthy et al. |
| 2018/0188045 A1 | 7/2018 | Wheeler et al. |
| 2018/0190046 A1 | 7/2018 | Levinson et al. |
| 2018/0264648 A1 | 9/2018 | Kim et al. |
| 2018/0305125 A1 | 10/2018 | Guo et al. |
| 2018/0336421 A1 | 11/2018 | Huang et al. |
| 2018/0362270 A1 | 12/2018 | Clucas et al. |
| 2019/0079537 A1 | 3/2019 | Yoshida et al. |
| 2019/0129425 A1 | 5/2019 | Drexler |
| 2019/0129431 A1 | 5/2019 | Yalla et al. |
| 2019/0133397 A1 | 5/2019 | Choe |
| 2019/0146500 A1 | 5/2019 | Yalla et al. |
| 2019/0179307 A1 | 6/2019 | Anderson et al. |
| 2019/0323845 A1 | 10/2019 | Agarwal |
| 2020/0047343 A1 | 2/2020 | Bal et al. |
| 2020/0050213 A1 | 2/2020 | Lim |
| 2020/0051443 A1 | 2/2020 | Zhao et al. |
| 2020/0082179 A1 | 3/2020 | Sugie |
| 2020/0089232 A1 | 3/2020 | Gdalyahu et al. |
| 2020/0104289 A1 | 4/2020 | Premawardena |
| 2020/0206928 A1 | 7/2020 | Denenberg et al. |
| 2022/0024047 A1 | 1/2022 | Bouchard et al. |
| 2022/0341906 A1 | 10/2022 | Lam et al. |
| 2022/0355495 A1 | 11/2022 | Rembisz et al. |
| 2022/0365533 A1 | 11/2022 | Drexler |

FOREIGN PATENT DOCUMENTS

| | | |
|---|---|---|
| CN | 108839025 B | 10/2020 |
| DE | 112018006030 T5 | 9/2020 |
| EP | 2385435 A1 | 11/2011 |
| JP | 2009031884 A | 2/2009 |
| JP | 2009123045 A | 6/2009 |
| WO | 2011146259 A2 | 11/2011 |

OTHER PUBLICATIONS

(56) References Cited

OTHER PUBLICATIONS

Takahashi et al., "Developing a mobile robot for transport applications in the hospital domain", Mar. 2010, Robotics and Autonomous Systems 58 (2010). Year: 2010).
Hasan et al., "An Autonomous Robot for Intelligent Security Systems", Aug. 2018, 9th IEEE Control and System Graduate Research Colloquium (ICSGRC 2018). (Year: 2018).
Bengel et al., "Mobile Robots for Offshore Inspection and Manipulation", Oct. 2009, the 2009 IEEE/RSJ International Conference on Intelligent Robots and Systems. (Year: 2009).
Wikipedia Vehicular Automation, https://web.archive.org/web/20140402022211/https://en.wikipedia.org/wiki/vehicular_automation, retrieved by Archive.org on Apr. 2, 2014 (Year: 2014) (3 pages).
http://www.digitalglobe.com/downloaded on May 6, 2014 (3 pages).

\* cited by examiner

STAND-ALONE SELF-DRIVING MATERIAL-TRANSPORT VEHICLE

CROSS-REFERENCE TO RELATED PATENT APPLICATIONS

The application is a continuation of U.S. application Ser. No. 16/539,249 filed on Aug. 13, 2019, which is a continuation of International Application No. PCT/CA2018/050464 filed on Apr. 18, 2018, which claims the benefit of U.S. Provisional Application No. 62/486,936, filed on Apr. 18, 2017. The complete disclosure of U.S. Application Ser. No. 16/539,249, International Application No. PCT/CA2018/050464 and U.S. Provisional Application No. 62/486,936 are incorporated herein by reference.

FIELD

The specification relates generally to self-driving vehicles, and specifically to a stand-alone self-driving material-transport vehicle.

BACKGROUND

Automated vehicles are presently being considered for conducting material-transport tasks within industrial facilities such as manufacturing plants and warehouses. Typical systems include one or more automated vehicles, and a centralized system for assigning tasks and generally managing the automated vehicles. These centralized systems interface with enterprise resource planning systems and other informational infrastructure of the facility in order to coordinate the automated vehicles with other process and resources within the facility.

However, such an approach requires a significant amount of infrastructure integration and installation before a vehicle can be used for any tasks. For example, automated vehicles may be dependent on the centralized system in order to obtain location information, maps, navigation instructions, and tasks, rendering the automated vehicles ineffective without the associated use of the centralized system.

SUMMARY

In a first aspect, there is a method of mapping an industrial facility with a self-driving vehicle. The method comprises displaying a graphical map on a graphical user-interface device based on a map stored in a non-transient computer-readable medium of the vehicle. A navigation instruction is received based on the graphical map, and the vehicle is navigated based on the navigation instruction. A feature of the facility is sensed using a sensor system of the vehicle, and the feature is located relative to the map. An updated map is stored on the medium based on the map and the feature.

According to some embodiments, the navigation instruction is based on a location relative to the map, and navigating the vehicle comprises autonomously navigating the vehicle to the location.

According to some embodiments, the navigation instruction comprises a direction, and navigating the vehicle comprises semi-autonomously navigating the vehicle based on the direction.

According to some embodiments, the method further comprises updating the displayed graphical map based on the feature.

According to some embodiments, the method further comprises transmitting the updated map to a second self-driving vehicle.

According to some embodiments, transmitting the updated map to the second self-driving vehicle comprises transmitting the updated map to a fleet-management system and subsequently transmitting the map from the fleet-management system to the second vehicle.

According to some embodiments, the method comprises the preliminary step of determining a map of the facility relative to the vehicle.

In a second aspect, there is a method of commanding a self-driving vehicle in an industrial facility. The method comprises determining a map of the facility relative to the vehicle, displaying a graphical map based on the map, and navigating the vehicle in a semi-autonomous mode. A recipe is recorded based on a plurality of semi-autonomous navigation steps associated with navigating the vehicle in the semi-autonomous mode.

According to some embodiments, the recording the recipe comprises deriving a plurality of tasks associated with the plurality of semi-autonomous navigation steps, and the recipe comprises the plurality of tasks.

According to some embodiments, the method further comprises sensing a feature of the facility using a sensor system of the vehicle, and generating a substitute navigation step based on at least one semi-autonomous navigation step and the feature. The recipe is based on the substitute navigation step.

According to some embodiments, the recipe does not include the semi-autonomous navigation step based on which the substitute navigation step was generated.

According to some embodiments, the method comprises transmitting the recipe to a second self-driving vehicle so that the second vehicle can autonomously navigate based on the recipe.

According to some embodiments, transmitting the recipe to the second self-driving vehicle comprises transmitting the recipe to a fleet-management system and subsequently transmitting the recipe from the fleet-management system to the second vehicle.

In a third aspect, there is a self-driving transport system. The system comprises a self-driving vehicle and a graphical user-interface device. The vehicle has a drive system for moving the vehicle and a control system for controlling the drive system. The graphical user-interface device is in communication with the control system for receiving navigation instructions from a user, and transmitting a corresponding navigation command to the control system. The control system receives the navigation command and controls the drive system to autonomously move the vehicle according to the navigation instruction.

According to some embodiments, the control system has a non-transitory computer-readable medium for storing a map. The self-driving vehicle has a server in communication with the control system for generating a graphical map based on the map, and the graphical user-interface device in communication with the vehicle comprises the graphical user-interface device in wireless communication with the server.

According to some embodiments, the graphical user-interface device comprises a coordinate system having a plurality of coordinates associated with the graphical map, and a user-input device for selecting a coordinate. The selected coordinate is transmitted from the graphical user-interface device to the server, and the coordinate corresponds to a location in the map.

According to some embodiments, the control system has a non-transitory computer-readable medium for storing a map. The graphical user-interface device in communication with the vehicle comprises the graphical user-interface device in wireless communication with the control system. The graphical user-interface device is configured to receive the map from the control system and generate a graphical map based on the map.

According to some embodiments, the graphical user-interface device comprises a coordinate system having a plurality of coordinates associated with a graphical map, and a user-input device for selecting a coordinate. The graphical user-input device transmits a location on the map corresponding to the selected coordinate to the control system.

According to some embodiments, the system comprises a fleet-management system. The vehicle comprises a sensor system for sensing objects within a peripheral environment of the vehicle, and the control system comprises a non-transitory computer-readable medium for storing a map based on the sensed objects and a transceiver in communication with the fleet-management system. The control system transmits the map to the fleet-management system using the transceiver.

According to some embodiments, the system comprises a fleet-management system. The control system comprises a non-transitory computer-readable medium for storing a vehicle status based on the performance of the vehicle and a transceiver in communication with the fleet-management system. The control system transmits the vehicle status to the fleet-management system using the transceiver.

According to some embodiments, the system further comprises a fleet-management system. The control system comprises a non-transitory computer-readable medium for storing a vehicle configuration and a transceiver in communication with the fleet-management system, and the control system transmits the vehicle status to the fleet-management system using the transceiver.

According to some embodiments, the control system receives a recovery configuration from the fleet-management system using the transceiver, stores the recovery configuration in the medium, and controls the vehicle according to the recovery configuration.

BRIEF DESCRIPTIONS OF THE DRAWINGS

Embodiments are described with reference to the following figures, in which.

DETAILED DESCRIPTION OF THE EMBODIMENTS

Figure 1:
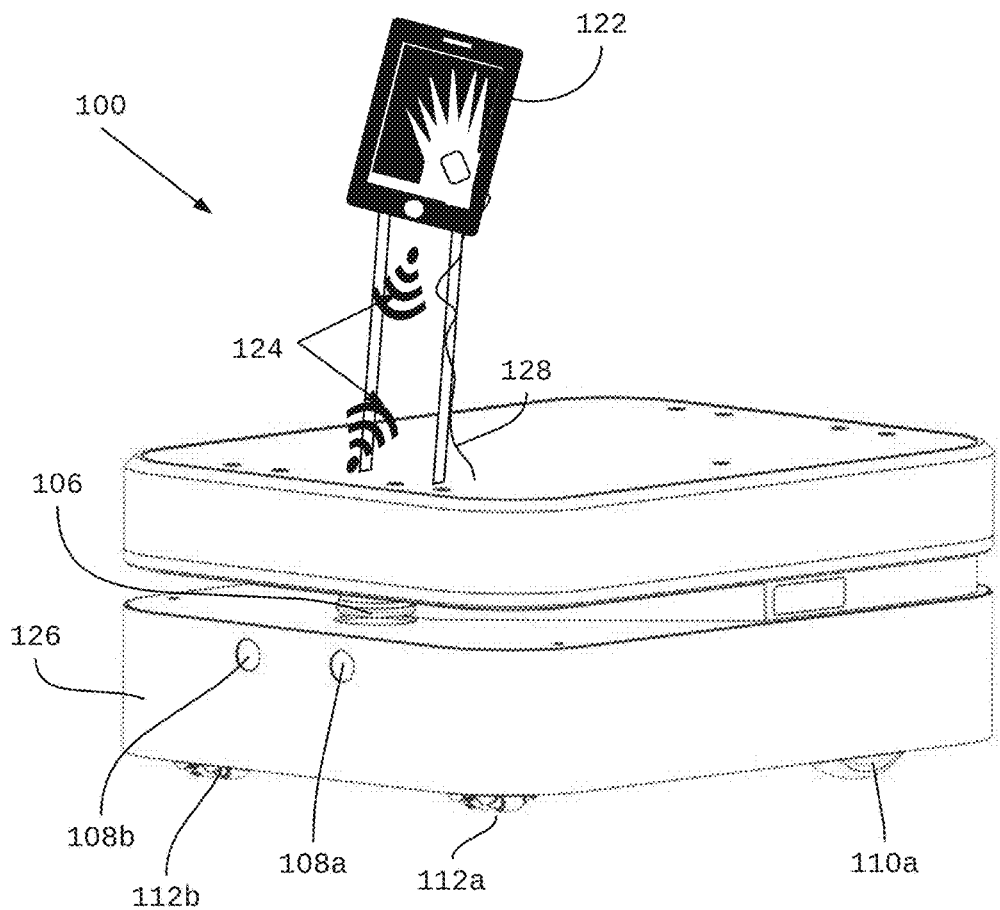
FIG. 1 depicts a stand-alone self-driving material-transport vehicle according to a non-limiting embodiment.

Referring to FIG. 1, there is shown a stand-alone self-driving material-transport vehicle 100 according to a non-limiting embodiment. The vehicle comprises a vehicle body 126, sensors 106, 108a, and 108b for sensing the peripheral environment of the vehicle 100, and wheels 110a, 112a, and 112b for moving and directing the vehicle 100.

A graphical user-interface device 122 is mounted on the vehicle body 126. The graphical user-interface device 122 includes a wireless transceiver (not shown) for communicating with another wireless transceiver (not shown) inside the vehicle body 126 via a communication link 124. According to some embodiments, a cable 128 connects from within the vehicle body 126 to the graphical user-interface device 122 in order to provide power to the graphical user-interface device 122 and/or a communications link. According to some embodiments, the graphical user-interface device 122 may operate with its own power supply (e.g. batteries) and may be removabley mounted on the vehicle body 126.

Figure 2:
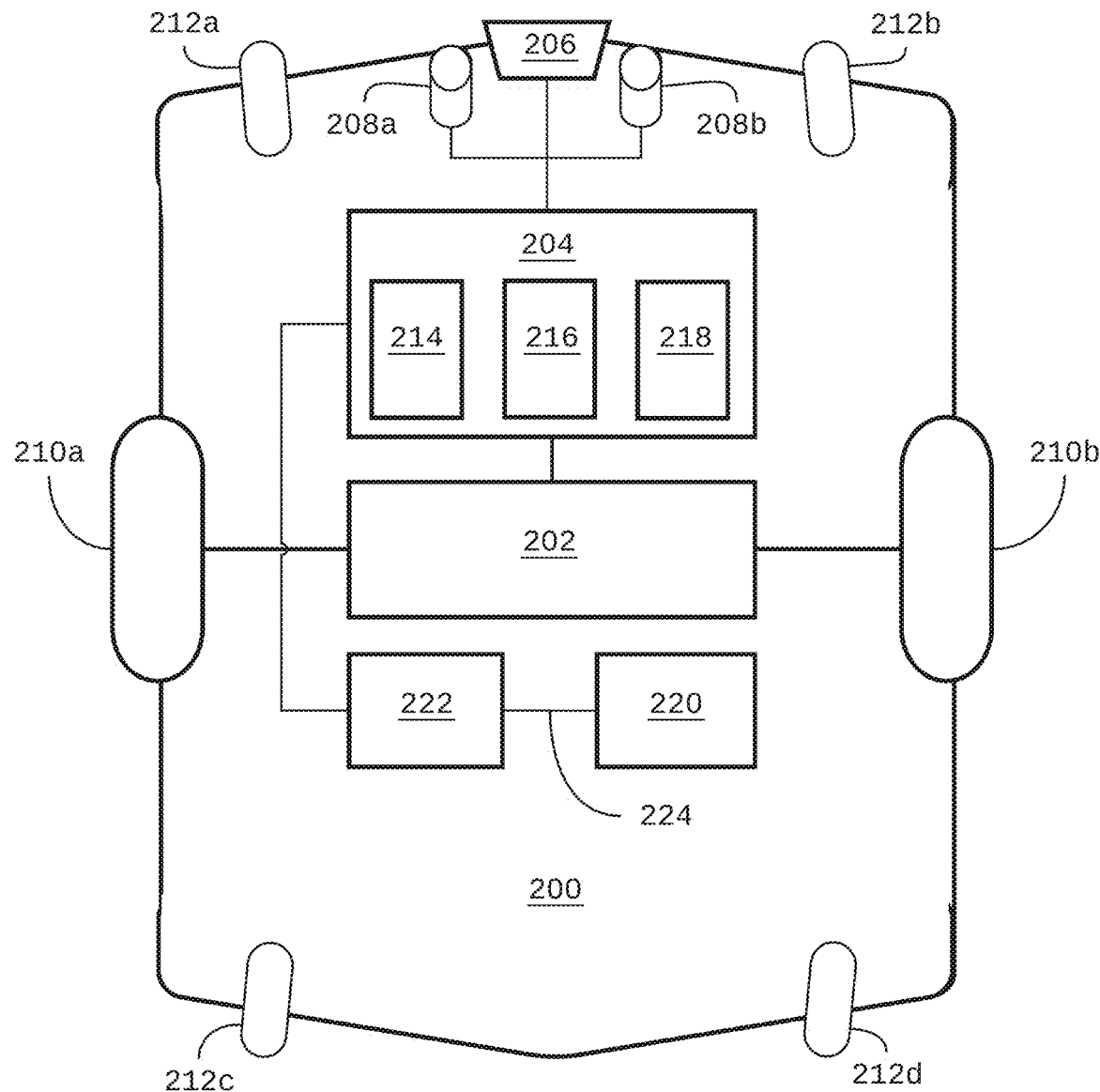
FIG. 2 depicts a system diagram of a stand-alone self-driving material-transport vehicle according to a non-limiting embodiment.

Referring to FIG. 2, there is shown a self-driving material-transport vehicle 200, according to some embodiments, for deployment in a facility, such as a manufacturing facility, warehouse or the like. The facility can be any one of, or any suitable combination of, a single building, a combination of buildings, an outdoor area, and the like. A plurality of vehicles 200 may be deployed in any particular facility.

The vehicle comprises a drive system 202, a control system 204, and one or more sensors 206, 208a, and 208b.

The drive system 202 includes a motor and/or brakes connected to drive wheels 210a and 210b for driving the vehicle 200. According to some embodiments, the motor may be an electric motor, combustion engine, or a combination/hybrid thereof. Depending on the particular embodiment, the drive system 202 may also include control interfaces that can be used for controlling the drive system 202. For example, the drive system 202 may be controlled to drive the drive wheel #10a at a different speed than the drive wheel #10b in order to turn the vehicle 200. Different embodiments may use different numbers of drive wheels, such as two, three, four, etc.

According to some embodiments, additional wheels 212 may be included (as shown in FIG. 2, the wheels 212a, 212b, 212c, and 212d may be collectively referred to as the wheels 212). Any or all of the additional wheels 212 may be wheels capable of allowing the vehicle 200 to turn, such as castors, omni-directional wheels, and Mecanum wheels.

The control system 204 comprises a processor 214, a memory 216, and a non-transitory computer-readable medium 218. According to some embodiments, the control system 204 may also include a communications transceiver (not shown in FIG. 2), such as a wireless transceiver for communicating with a wireless communications network (e.g. using an IEEE 802.11 protocol or similar).

One or more sensors 206, 208a, and 208b may be included in the vehicle 200. For example, according to some embodiments, the sensor 206 may be a LiDAR device (or other optical/laser, sonar, or radar range-finding sensor). The sensors 208a and 208b may be optical sensors, such as video cameras. According to some embodiments, the sensors 208a and 208b may be optical sensors arranged as a pair in order to provide three-dimensional (e.g. binocular or RGB-D) imaging.

The control system 204 uses the medium 218 to store computer programs that are executable by the processor 214 (e.g. using the memory 216) so that the control system 204 can provide automated or autonomous operation to the vehicle 200. Furthermore, the control system 204 may also store an electronic map that represents the known environment of the vehicle 200, such as an industrial facility, in the media 218.

For example, the control system 204 may plan a path for the vehicle 200 based on a known destination location and the known location of the vehicle. Based on the planned path, the control system 204 may control the drive system 202 in order to drive the vehicle 200 along the planned path. As the vehicle 200 is driven along the planned path, the sensors 206, and/or 208a and 208b may update the control system 204 with new images of the vehicle's environment, thereby tracking the vehicle's progress along the planned path and updating the vehicle's location.

Since the control system 204 receives updated images of the vehicle's environment, and since the control system 204 is able to autonomously plan the vehicle's path and control the drive system 202, the control system 204 is able to determine when there is an obstacle in the vehicle's path, plan a new path around the obstacle, and then drive the vehicle 200 around the obstacle according to the new path.

The vehicle 200 can use the control system 240 to autonomously navigate to a waypoint or destination location provided to the vehicle 200, without receiving any other instructions from an external system. For example, the control system 204, along with the sensors 206, and/or 208a, and 208b, enable the vehicle 200 to navigate without any additional navigation aids such as navigation targets, magnetic strips, or paint/tape traces installed in the environment in order to guide the vehicle 200.

The vehicle 200 is equipped with a graphical user-interface device 220. The graphical user-interface device 220 includes a graphical display and input buttons. According to some embodiments, the graphical user-interface device comprises a touchscreen display. In some cases, the graphical user-interface device may have its own processor, memory, and/or computer-readable media. In some cases, the graphical user-interface device may use the processor 214, the memory 216, and/or the media 218 of the control system 204.

The graphical user-interface device 220 is generally capable of displaying a graphical map based on a map stored in the control system 204. As used here, the term "map" refers to an electronic representation of the physical layout and features of a facility, which may include objects within the facility, based on a common location reference or coordinate system. The term "graphical map" refers to a graphical representation of the map, which is displayed on the graphical user-interface device 220. The graphical map is based on the map such that locations identified on the graphical map correspond to locations on the map, and vice-versa.

According to some embodiments, the vehicle 200 may also be equipped with a server 222. According to some embodiments, the server may include computer hardware such as a processor, memory, and non-transitory computer-readable media. According to some embodiments, the server may comprise software applications that are executed using the control system 204. According to some embodiments, the server 222 may be a web server for serving a web page (e.g. including a graphical map) to the graphical user-interface device 220.

According to some embodiments, the graphical user-interface device 220 may comprise software applications for rendering a graphical map based on data received from the server 222.

In the case that the vehicle 200 is equipped with the server 222, the graphical user-interface device 220 communicates with the server 222 via a communications link 224. The communications link 224 may be implemented using any suitable technology, for example, a wireless (WiFi) protocol such as the IEEE 802.11 family, cellular telephone technology (e.g. LTE or GSM), etc., along with corresponding transceivers in the graphical user-interface device 220 and the server 222 or control system 204.

Generally speaking, the graphical user-interface device 220 is in communication with the control system 204. According to some embodiments, this may be via a server 222, or the graphical user-interface device 220 may be in direct communication with the control system 204. As such, the graphical user-interface device 220 can receive a map from the control system 204 in order to display a rendered graphical map based on the map. Similarly, the graphical user-interface device 220 can send navigation instructions to the control system 204, such as goals, waypoints, zones, and guided navigation instructions. The control system 204 can then command the drive system #H02 in accordance with the navigation instructions.

According to some embodiments, the graphical user-interface 220 may display a graphical map in association with a coordinate system that corresponds to locations on the map. In this case, the graphical user-interface device 220 includes a user-input device (e.g. touchscreen, buttons, keyboard, etc.) for selecting a coordinate or multiple coordinates.

According to some embodiments, the graphical user-interface device 224 may be a laptop or desktop computer remotely located from the rest of the vehicle 200, in which case the communications link 224 may represent a combination of various wired and wireless network communications technologies.

Figure 3:
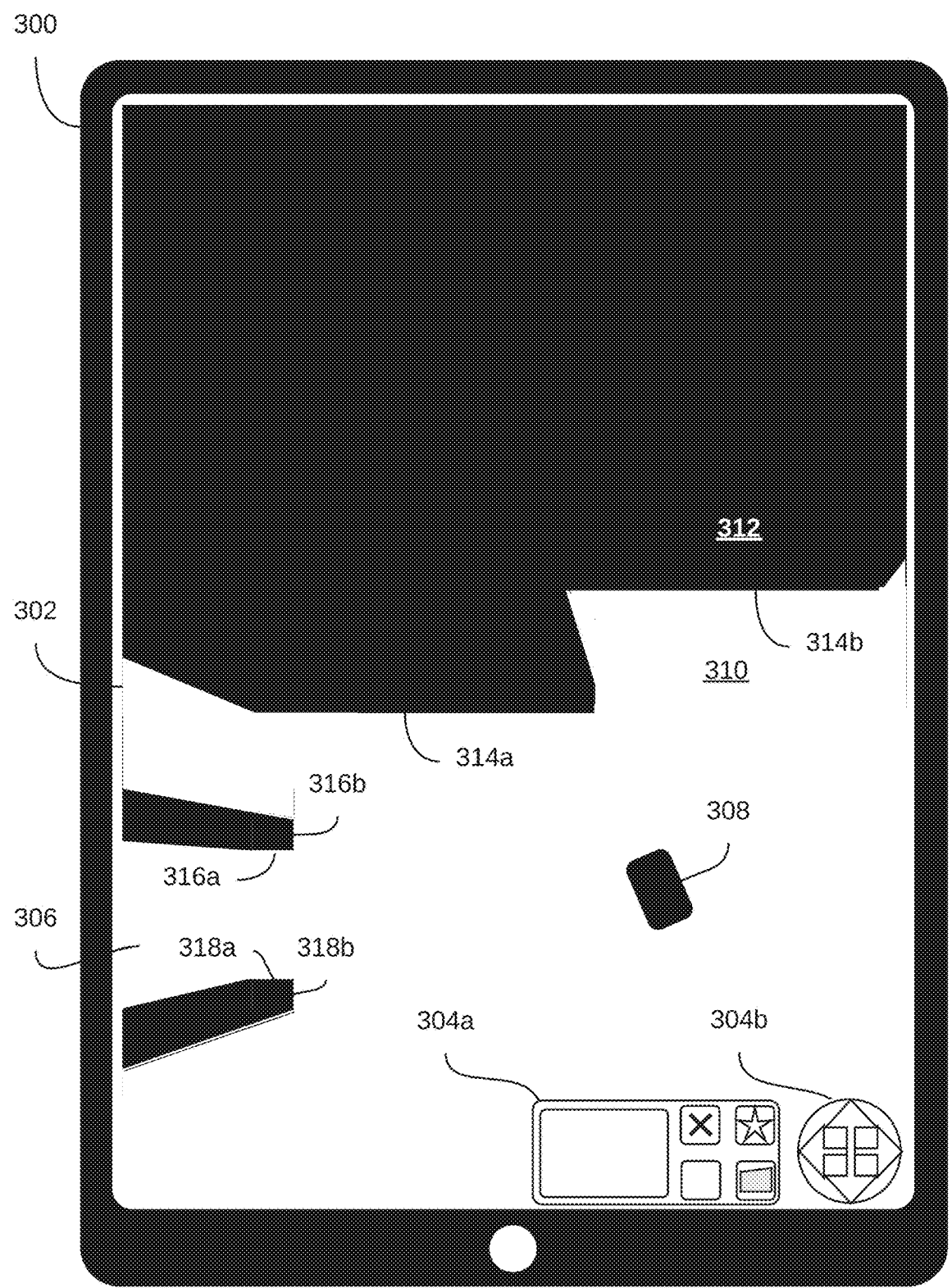
FIG. 3 depicts a graphical user-interface device for a stand-alone self-driving material-transport vehicle displaying a graphical map at a first time according to a non-limiting embodiment.

Referring to FIG. 3, there is shown a graphical user-interface device 300 according to a non-limiting embodiment. The graphical user-interface device 300 is shown in the form of a tablet computer in the example of FIG. 3. The graphical user-interface device may be any type of computing device that is capable of communicating with a self-driving vehicle. For example, the graphical user-interface device may be a mobile phone (e.g. with WiFi or cellular communications enabled), a laptop computer, a desktop computer, etc. Generally, if the graphical user-interface device is not physically mounted on the self-driving vehicle, then it requires communications with the self-driving vehicle via a local-area network, wide-area network, intranet, over the Internet, etc.

According to some embodiments, the graphical user-interface device may be mounted directly on and physically-integrated with the self-driving vehicle. For example, a touch-screen panel or graphical display with other inputs may be included on the self-driving vehicle in order to provide a user-interface device.

The graphical user-interface device 300 includes a graphical display 302. According to some embodiments, the graphical display 302 is a touch-screen display for receiving input from a human operator. According to some embodiments, the graphical user-interface device 300 may also include input buttons (e.g. a keypad) that are not a part of the graphical display 302.

As shown in FIG. 3, the graphical display 302 displays a set of input buttons 304*a* and 304*b* (collectively referred to as buttons 304) and a graphical map 306.

The graphical map 306 includes a self-driving material-transport vehicle 308, and can be generally described as including known areas 310 of the graphical map 306, and unknown areas 312 of the graphical map 306. In the example shown, unknown areas of the graphical map 306 are shown as black and known areas of the map are shown as white. Any color or pattern may be used to graphically indicate the distinction between unknown areas and known areas.

As previously described, the graphical map 306 is associated with a map stored in the control system of the self-driving vehicle with which the graphical user-interface device 300 is communicating. This is the same self-driving vehicle as is represented graphically by the self-driving vehicle 308 on the graphical map 306. As such, the unknown areas of the graphical map 312 correspond to unknown areas of the map, and known areas 310 of the graphical map correspond to known areas of the map.

According to some embodiments, the control system may not store unknown areas of the map. For example, the map stored in the vehicle's control system may comprise only the known areas of the map, such that the process of mapping comprises starting with the known areas of a facility, adding them to the map, discovering new areas of the facility such that they also become known, and then adding the new areas to the map as well, relative to the previously-known areas. In this case, the generation of the graphical map may comprise the additional step of interpolating the unknown areas of the map so that a contiguous graphical map can be generated that represents both the known and unknown areas of the facility.

If, as an example, it is assumed that the vehicle 308 shown in the graphical map 306 is in its initial position (e.g. has not moved since being turned on), then the known area 310 of the graphical map 306 represents the peripheral environment of the vehicle 308. For example, according to the graphical map 306, the vehicle 308 can see an edge 314*a* and edge 314*b* at the boundary of the unknown area 312. Similarly, the vehicle 308 can see edges 316*a* and 316*b* of what might be an object, and edges 318*a* and 318*b* of what might be a second object. Generally, the unknown areas of the map lie in the shadows of these edges, and it cannot be determined whether there are other objects included behind these edges.

The buttons 304 may generally be used to command the vehicle (as represented by the vehicle 308) and to provide navigation instructions. For example, the buttons 304*b* are shown as a joystick-type interface that allows for the direction of the vehicle to be selected, such as to provide guided navigation instructions to the vehicle. The buttons 304*a* allow for the selection of different types of navigation instructions, such as goals, waypoints, and zones. For example, a human operator may select the goal button, and then select a location on the graphical map corresponding to the intended location of the goal.

Figure 4:
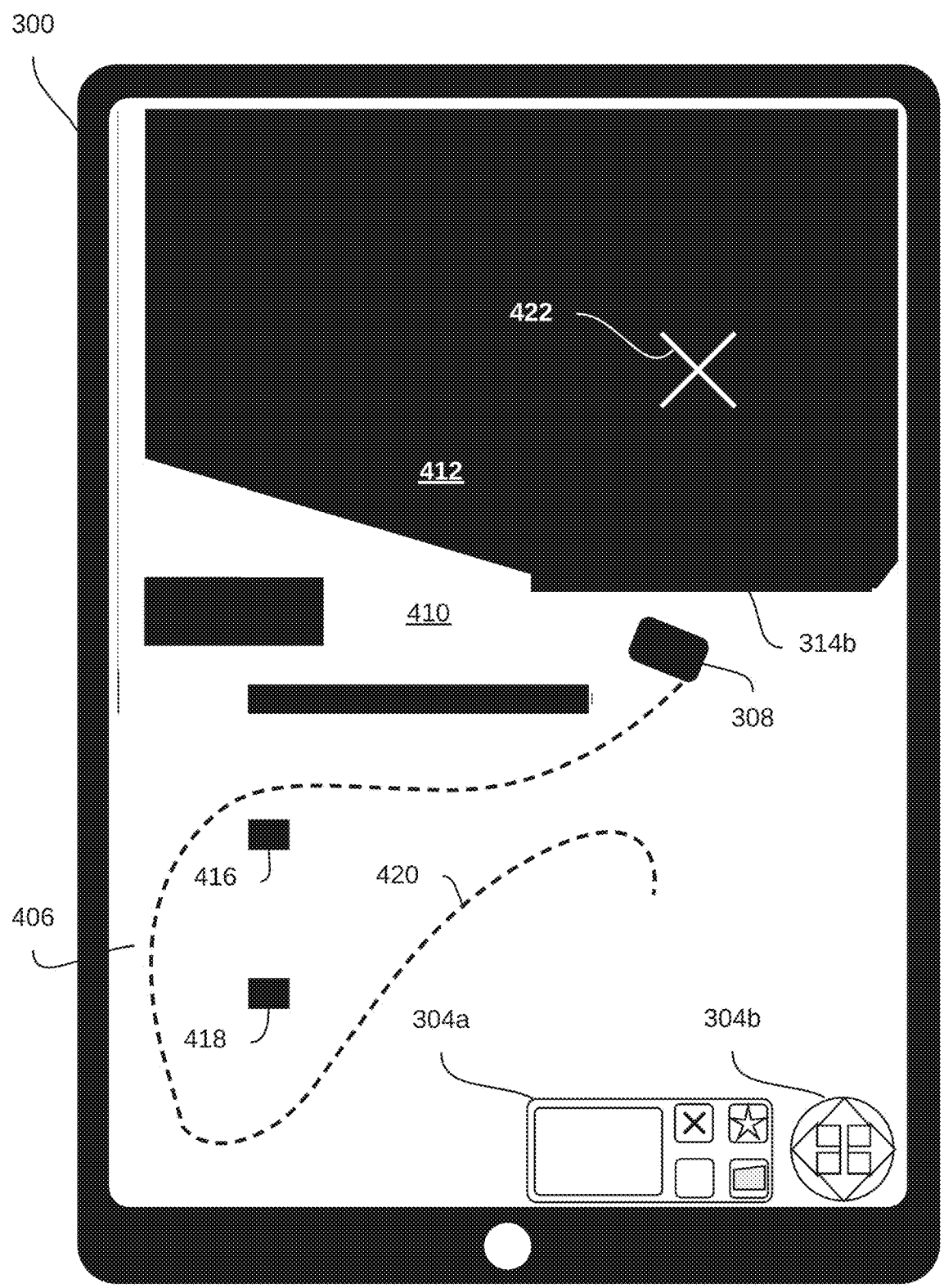
FIG. 4 depicts the graphical user-interface device of FIG. 3 displaying the graphical map at a second time according to a non-limiting embodiment.

Referring to FIG. 4, there is shown the graphical user-interface device 300 of FIG. 3 displaying a graphical map 406 that was generated based on the graphical map 306 at a time after the graphical map 306 was generated, according to a non-limiting embodiment. The dashed line 420 indicates the travel path that the vehicle 308 has travelled from its position shown in FIG. 3. For example, the travel path 420 may represent the result of a human operator providing guided navigation instructions using the joystick-type interface buttons 304*b*, and/or a series of goals or waypoints set using the buttons 304*a*, to which the vehicle may have navigated autonomously.

As can be seen in the graphical map 406, the known area 410 is substantially larger than the known area 310 of the graphical map 306, and accordingly, the unknown area 412 is smaller than the unknown area 312. Furthermore, due to the travel path 420, it can be seen that two objects 416 and 418 exist in the facility. In the example shown, the objects 416 and 418 are shown as black, indicating that the objects themselves are unknown (i.e. only their edges are known). According to some embodiments, individual colors or patterns can be used to indicate objects or specific types of objects on the graphical map. For example, images of the objects may be captured by the vehicle's vision sensor systems and analysed to determine the type of object. In some cases, a human operator may designate a type of object, for example, using the buttons 304.

As an example, once the vehicle 308 is at the position shown in FIG. 4, a human operator may use the buttons 304*a* to set a goal 422 for the vehicle. In this case, the human operator may have desired to send the vehicle further into the unknown area 412 in order to map the unknown area (in other words, reveal what is behind the edge 314*b*).

Figure 5:
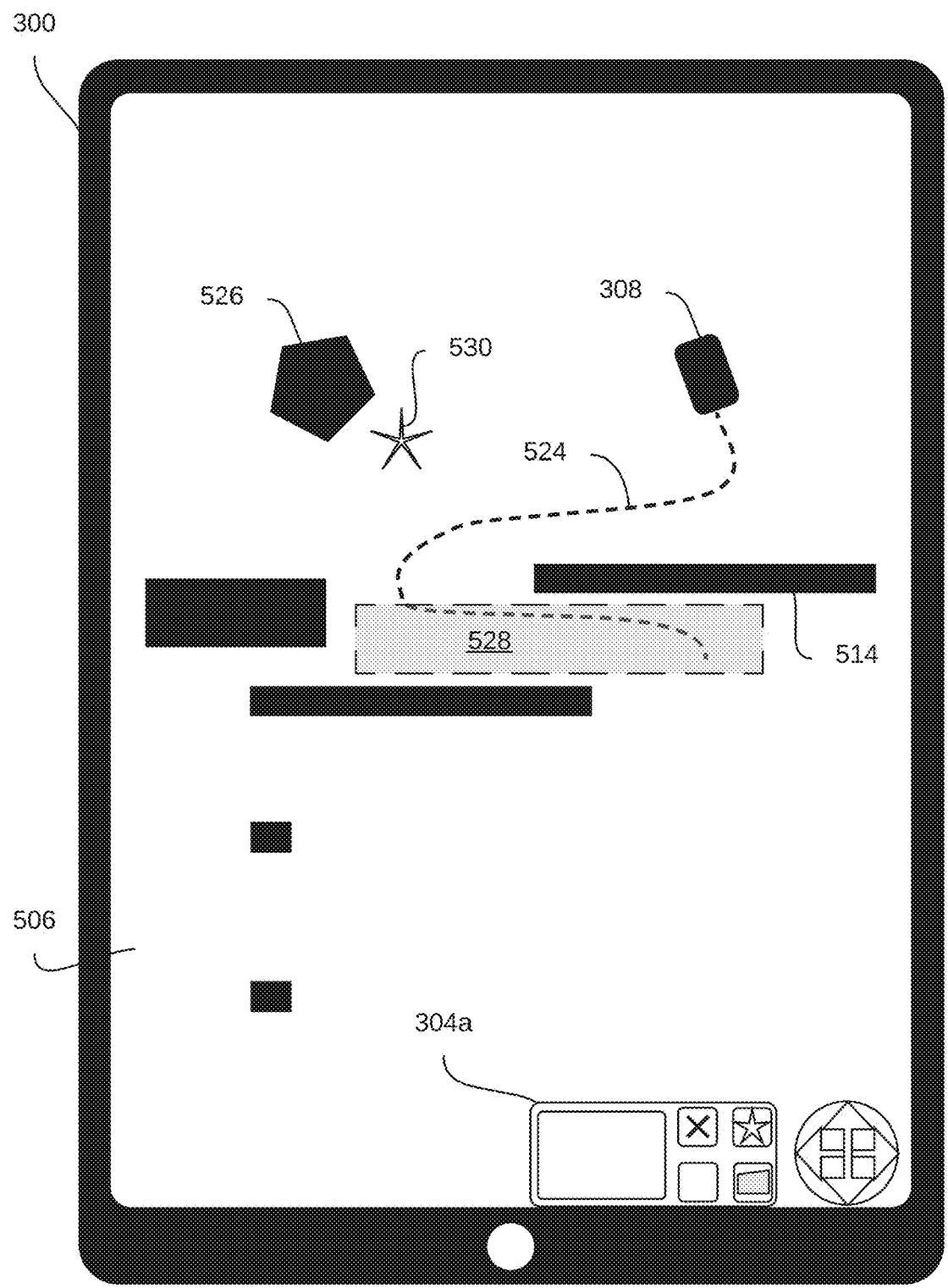
FIG. 5 depicts the graphical user-interface device of FIG. 3 displaying the graphical map at a third time according to a non-limiting embodiment.

Referring to FIG. 5, there is shown the graphical user-interface device 300 of FIG. 3 displaying a graphical map 506 that was generated based on the graphical map 406 at a time after the graphical map 406 was generated, according to a non-limiting embodiment. The dashed line 524 indicates the travel path that the vehicle 308 has travelled from its position shown in FIG. 4 according to the autonomous navigation of the vehicle. As the vehicle 308 travelled along the travel path 524, it continued to map the facility, and was therefore able to detect and navigate around the object 514 on the way to its destination, according to the goal previously set.

The graphical map 506 indicates all of the features and objects of the facility known to the vehicle 308. Based on the known area of the map, and according to an example depicted in FIG. 5, a human operator may identify a narrow corridor in a potentially high-traffic area in proximity to the object 514. As such, the human operator may use the buttons 304*a* to establish a zone 528. According to some embodiments, the human operator may associate a "slow" attribute with the zone 528 such as to limit the speed of the vehicle 308 (or other vehicles, if the map is shared) as it travels through the zone 528.

Furthermore, since the machine 526 is represented on the graphical map 506, the human operator may use the buttons 304*a* to set a waypoint 530 adjacent to the machine 526.

Figure 6:
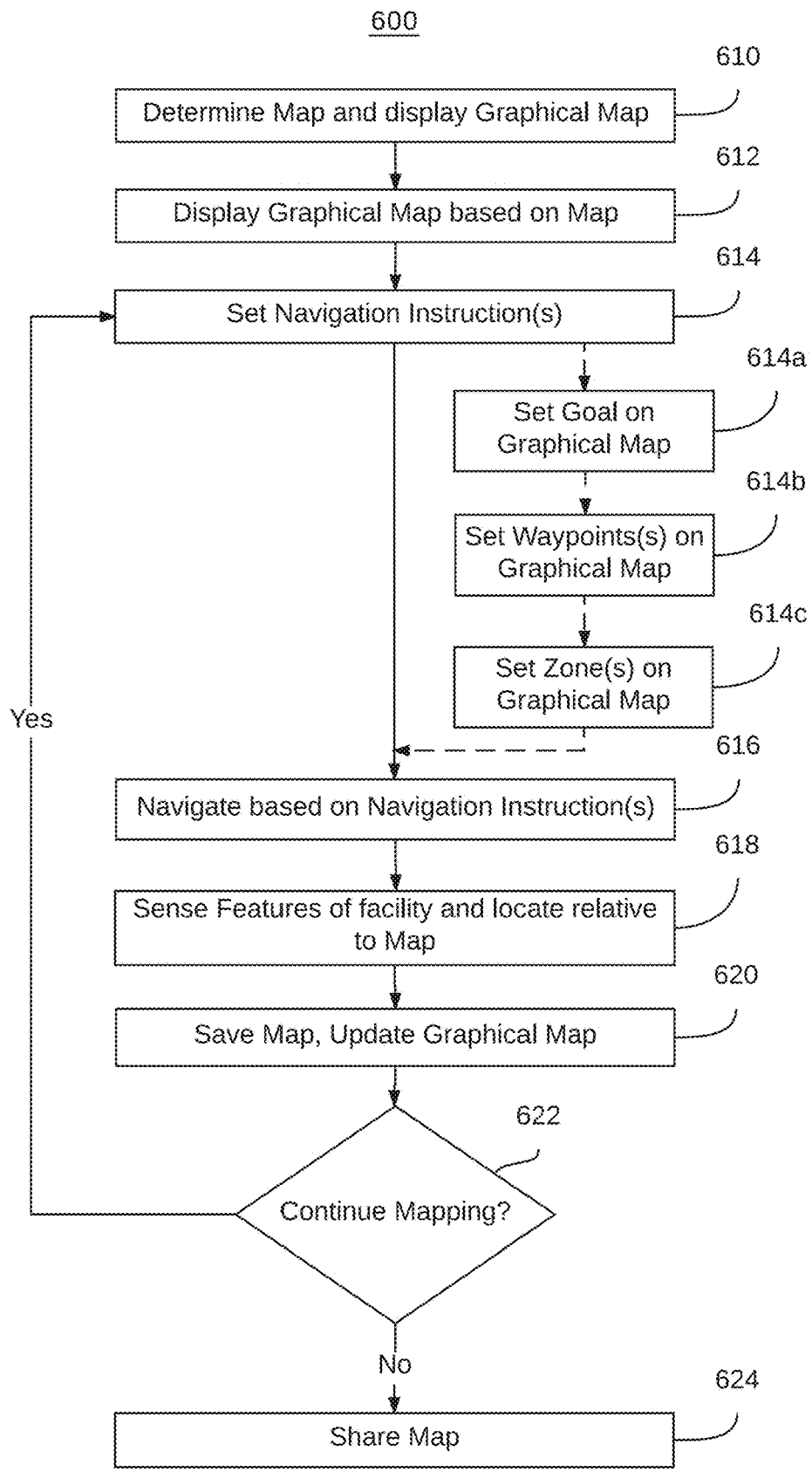
FIG. 6 depicts a flow diagram of a method of mapping an industrial facility with a self-driving vehicle according to a non-limiting embodiment.

Referring to FIG. 6, there is shown a method 600 of mapping an industrial facility with a self-driving vehicle according to a non-limiting embodiment. According to some embodiments, computer instructions may be stored on non-transient computer-readable media on the vehicle and/or on a remote graphical user-interface device, which, when executed by at least one processor on the vehicle and/or graphical user-interface device, cause the at least one processor to be configured to execute at least some steps of the method.

The method 600 begins at step 610 when a map of a facility is determined by a self-driving vehicle. According to some embodiments, the map is an electronic map of the facility that can be stored on a non-transient computer-readable medium on the vehicle. In some cases, the map may be incomplete, meaning that the map does not represent the entire physical area of the facility. Generally, the process of mapping can be described as a process of bringing the map to closer to a state of completion. Even when the entire physical area of the facility is represented in the map, further mapping may be done to update the map based on changes to the facility, such as the relocation of static objects (e.g. shelves, stationary machines, etc.) and dynamic objects (e.g. other vehicles, human beings, inventory items and manufacturing workpieces within the facility, etc.). To this end, in some cases, it can be said that all maps are "incomplete", either in space (the entire physical area of the facility is not yet represented in the map) and/or in time (the relocation of static and dynamic objects in the map are not yet represented in the map).

According to some embodiments, determining the map may comprises using the vehicle to generate a new map for itself. For example, if a vehicle is placed in a facility for the first time, and the vehicle has no other map of the facility available, the vehicle may generate its own map of the facility. According to some embodiments, generating a new map may comprise assuming an origin location for the map, such as the initial location of the vehicle.

According to some embodiments, determining the map may comprise receiving a map from another vehicle or from a fleet-management system. For example, an incomplete map may be received directly from another vehicle that has partially mapped a different section (in space and/or time) of the same facility, or from another vehicle via the fleet-management system. According to some embodiments, a map may be received that is based on a drawing of the facility, which, according to some embodiments, may represent infrastructure features of the facility, but not necessarily all of the static and/or dynamic objects in the facility.

According to some embodiments, determining the map may comprise retrieving a previously-stored map from the vehicle's control system.

At step 612, a graphical map is displayed on a graphical user-interface device. The graphical map is based on the map that was determined during the step 610. According to some embodiments, the graphical map may include both unmapped and mapped areas of the facility, for example, as described with respect to FIG. 3, FIG. 4, and FIG. 5.

At step 614, navigation instructions are set. The navigation instructions are generally received from the graphical user-interface device based on the input of a human operator. For the sake of illustration, as shown in FIG. 6, navigation instructions may be related to setting goals for the vehicle at step 614a, setting waypoints in the facility at step 614b, and/or setting zones in the facility at step 614c. Each of step 614a, 614b, and 614c are merely examples of general navigation instructions at step 614, and any or all of these steps, as well as other navigation instructions, may be received from the graphical user-interface device. As used here, any of the steps 614a, 614b, and 614c may be individually or collectively referred to as the set navigation instruction step 614.

At any given time, the vehicle may operate according to any or all of an autonomous navigation mode, a guided navigation mode, and a semi-autonomous navigation mode.

The navigation instructions may also include guided navigation instructions determined by a human operator. For example, a human operator may use a directional indicator (e.g. a joystick-type interface) in order to provide the guided navigation instructions. These instructions generally comprise a real-time direction in which the vehicle is to travel. For example, if a human operator indicates an "up" direction in relation to the graphical map, then the vehicle will travel in the direction of the top of the graphical map. If the human operator then indicates a "left" direction in relation to the graphical map, the vehicle will turn to the left (e.g. drive to the left direction) in relation to the graphical map. According to some embodiments, when the human operator ceases to indicate a direction, the vehicle will stop moving. According to some embodiments, when the human operator ceases to indicate a direction, the vehicle will continue to move in the most-recently indicated direction until a future event occurs, such as the detection of an obstacle, and the subsequent autonomous obstacle avoidance by the vehicle. According to some embodiments, when the human operator ceases to indicate a direction, the vehicle will continue to autonomously navigate according to other navigation instructions, for example, towards a previously-determined waypoint or goal. As such, the indication of a direction for the vehicle to travel, such as determined relative to the graphical map, is a navigation instruction. Thus, some navigation instructions, such as guided navigation instructions, may be in a form that is relative to the current location, position, and/or speed of the vehicle, and some navigation instructions, such as waypoints, may be in a form that is relative to the facility or map.

If the navigation instructions correspond to a goal in the facility, then, at step 614a, the goal is set on the graphical map. A goal may be a particular location or coordinate indicated by a human operator relative to the graphical map, which is associated with a location or coordinate on the map. For example, if a human operator desires that the vehicle map an unknown or incomplete part of the map, then the human operator may set a goal within the corresponding unknown or incomplete part of the graphical map. Subsequently, the vehicle may autonomously navigate towards the goal location.

If the navigation instructions correspond to a waypoint in the facility, then, at step 614b, the waypoint is set on the graphical map. A waypoint may be a particular location or coordinate indicated by a human operator relative to the graphical map, which is associated with a location or coordinate on the map. For example, if a human operator desires that the vehicle navigate to a particular location in the facility, then the human operator may set a waypoint at the corresponding location on the graphical map. Subsequently, the vehicle may autonomously navigate towards the waypoint location. According to some embodiments, a waypoint may differ from a goal in that a waypoint can be labelled, saved, and identified for future use by the vehicle or other vehicles (e.g. via a fleet-management system). According to some embodiments, a waypoint may only be available in known parts of the map.

If the navigation instructions correspond to a zone in the facility, then, at step 614c, the zone is set on the graphical map. A zone may be an area indicated by a human operator relative to the graphical map, which is associated with an area on the map. For example, if a human operator desires that vehicles navigate through a particular area in a particular manner (or that they not navigate through a particular area at all), then the human operator may set a zone with corresponding attributes on the graphical map. Subsequently, the vehicle may consider the attributes of the zone when navigating through the facility.

At step 616, the vehicle navigates based on the navigation instructions set during the step 614. The vehicle may navigate in an autonomous mode, a guided-autonomous mode, and/or a semi-autonomous mode, depending, for example, on the type of navigation instruction received.

For example, if the navigation instructions comprise a goal or waypoint, then the vehicle may autonomously navigate towards the goal or waypoint. In other words, the vehicle may plan a path to the goal or waypoint based on the map, travel along the path, and, while travelling along the path, continue to sense the environment in order to plan an updated path according to any obstacles detected. Autonomous navigation is also relevant with respect to navigation instructions that comprise zones, since the autonomous navigation process takes the attributes of the zones into consideration.

For example, if the navigation instructions comprise a waypoint, and, during the course of the vehicle travelling to the waypoint, then the vehicle may semi-autonomously navigate towards the waypoint. This may occur if a human operator determines that the vehicle should alter course from its planned path on its way to the waypoint. The human operator may guide the vehicle on the altered course accordingly, for example, via guided navigation instructions. In this case, if the guided navigation instructions are complete (i.e. the human user stops guiding the vehicle off of the vehicle's autonomously planned path), the vehicle can continue to autonomously navigate to the waypoint.

The semi-autonomous navigation mode may be used, for example, if there is a preferred arbitrary path to the waypoint that the vehicle would be unaware of when autonomously planning its path. For example, if a waypoint corresponds to a particular stationary machine, or shelf, and, due to the constraints of the stationary machine, shelf, or the facility itself, it is preferred that the vehicle approach the stationary machine or shelf from a particular direction, then, as the vehicle approaches the stationary machine or shelf, the human operator can guide the vehicle so that it approaches from the preferred direction.

In another example of the vehicle navigating based on the navigation instructions set during the step 614, if the navigation instructions comprise a guided navigation instruction, then the vehicle may navigate according to the guided navigation instruction in a guided-autonomous navigation mode. For example, a human operator may guide the vehicle by indicating the direction (and, in some embodiments, the speed) of the vehicle, as previously described.

Operating the vehicle according to a guided-autonomous navigation instruction is distinct from a mere "remote-controlled" vehicle, since, even though the direction (and in some embodiment, the speed) of vehicle is being controlled by a human operator, the vehicle still maintains some autonomous capabilities. For example, the vehicle may autonomously detect and avoid obstacles within its peripheral environment, which may include the vehicle's control system overriding the guided instructions. Thus, in some cases, a human operator may not be able to drive the vehicle into an obstacle, such as a wall, since the vehicle's control system may autonomously navigate in order to prevent a collision with the obstacle regardless of the guided navigation instructions indicated by the human operator.

Furthermore, operating the vehicle according to a guided-autonomous navigation instruction is distinct from a human-operated vehicle operating with an autonomous collision-avoidance system, since the guided-autonomous navigation mode includes the vehicle continuously mapping its peripheral environment and the facility.

According to some embodiments, any or all of the steps 616, 618, or 620 may be run concurrently or in any other order. At step 618, the vehicle senses features of the facility within the vehicle's peripheral environment. For example, this may be done at the same time that the vehicle is navigating according to the step 616. The features may be sensed by the vehicle's sensors, and, using a processor on the vehicle, located relative to the map stored in the vehicle's memory and/or media. In some cases, the features may include the infrastructure of the facility such as walls, doors, structural elements such as posts, etc. In some cases, the features may include static features, such as stationary machines and shelves. In some cases, the features may include dynamic features, such as other vehicles and human pedestrians.

At step 620, the vehicle stores the map (e.g. an updated map that includes the features sensed during the step 620) on a storage medium of the vehicle. Based on the updated map, the graphical map on the graphical user-interface device is updated accordingly.

At step 622, a decision is made as to whether more mapping is desired. For example, a human operator may inspect the graphical map displayed on the graphical user-interface device, and determine that there is an unknown area of the facility that should be mapped, or that a known area of the facility should be updated in the map. If it is determined that more mapping is required, then the method returns to step 614. At step 614, new or subsequent navigation instructions may be set. For example, a new goal may be set for an unknown are of the map so that the unknown are can be mapped. If at step 622 it is determined that more mapping is not required, then the method proceeds to step 624.

At step 624, the vehicle may share the map. For example, the vehicle may retrieve the map from its media, and transmit the map to a fleet-management system, and/or directly to another vehicle. According to some embodiments, it may be necessary to install other equipment in order to share the map. For example, in some cases, the vehicle may be used as a stand-alone self-driving vehicle operating independently of a fleet-management system in order to map a facility. Subsequently, a fleet of vehicles and a fleet-management system may be installed in the facility, and the map may be transmitted to the fleet-management system from the vehicle. In other cases, the map may be shared with the fleet-management system or another vehicle using removable non-transient computer-readable media. In this way, a stand-alone self-driving vehicle can be used to map a facility prior to other vehicles or a fleet-management system being installed in the facility.

According to some embodiments, the vehicle may share additional information with the fleet-management system for the purposes of vehicle monitoring, diagnostics, and trouble shooting. For example, the vehicle may transmit vehicle status information pertaining to operating states such: offline, unavailable, lost, manual mode (autonomous navigation disabled), task failed, blocked, waiting, operating according to mission, operating without mission, etc.

The additional information may also include vehicle configuration information. For example, the vehicle may transmit vehicle configuration information pertaining to parameters of the vehicle's operating system or parameters of the vehicle's control system, sensor system, drive system, etc.

The fleet-management system may be configured to monitor the vehicle's status and/or configuration, create records of the vehicle's status and store back-up configurations. Furthermore, the fleet-management system may be configured to provide recovery configurations to the vehicle in the event that the robot's configuration is not operating as expected.

According to some embodiments, the vehicle status information and/or vehicle configuration information may be shared with a graphical user-interface device. For example, if the graphical user-interface device is a tablet, laptop, or desktop computer, then the graphical user-interface device can receive status and configuration information, record and back-up the information. Furthermore, the graphical-user interface device may provide recovery configuration to the vehicle in the event that the robot's configuration is not operating as expected. In some embodiments.

According to some embodiments, the vehicle may communicate with the graphical user-interface device independently of communicating with a fleet-management system (if one is present). For example, the vehicle may use a WiFi connection to connect with a fleet-management system, while simultaneously using a USB connection or another WiFi connection to share maps, status information, and configuration information with the graphical user-interface device.

Figure 7:
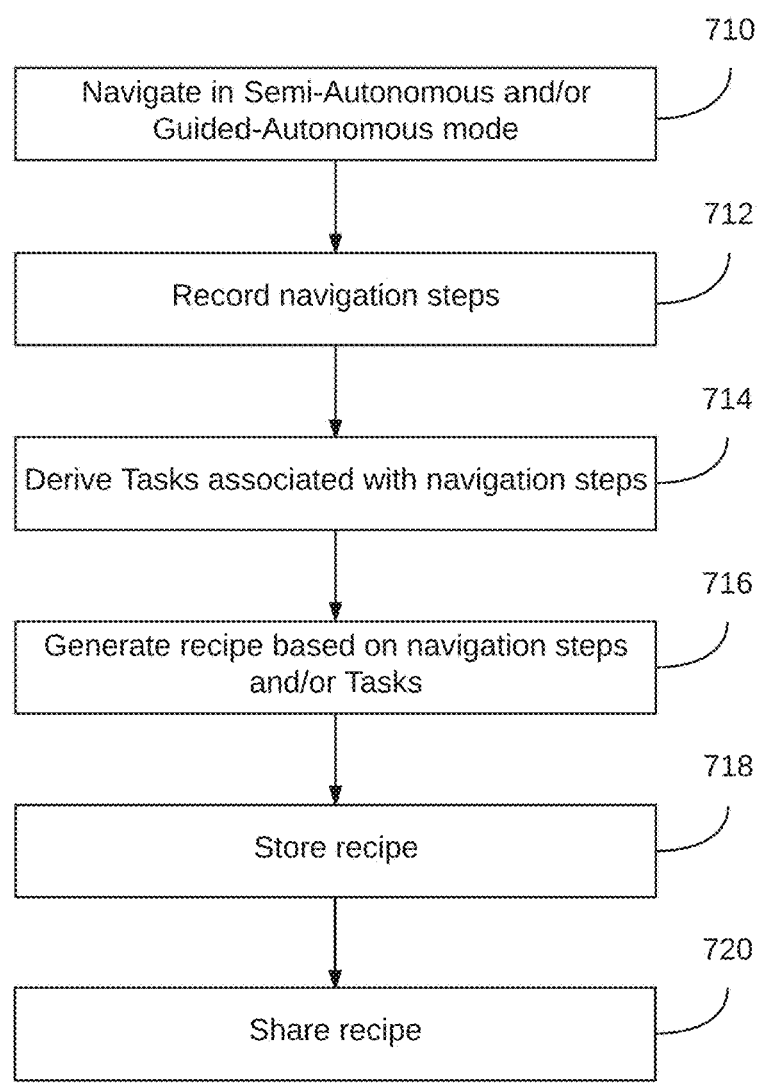
FIG. 7 depicts a method of commanding a self-driving vehicle in an industrial facility according to a non-limiting embodiment.

Referring to FIG. 7, there is shown a method 700 of commanding a self-driving vehicle in an industrial facility according to a non-limiting embodiment. According to some embodiments, the method 700 may executed using a stand-alone self-driving vehicle with a graphical user-interface device.

The method begins at step 710 when a self-driving vehicle is driven in a semi-autonomous navigation mode or a guided-autonomous navigation mode, as previously described. Generally, both the semi-autonomous and the guided-autonomous navigation modes are associated with navigation steps. These navigation steps may comprise navigation instructions indicated by a human operator using the graphical user-interface device, as well as autonomous navigation steps derived by the control system of the vehicle as a part of autonomous navigation.

At step 712, the navigation steps associated with the semi-autonomous and/or guided-autonomous navigation are recorded. According to some embodiments, these may be recorded using the memory and/or media of the vehicle's control system. According to some embodiments, these may be recorded using the memory and/or media of the graphical user-interface device.

At step 714, tasks associated with the navigation steps are derived. The tasks may be derived using one or both of the vehicle's control system and the graphical user-interface device. According to some embodiments, deriving the tasks may comprise translating the navigation steps into tasks that are known to the vehicle, and which can be repeated by the vehicle.

For example, a human operator may use guided navigation instructions to move the vehicle from a starting point to a first location associated with a shelf. The operator may guide the vehicle to approach the shelf from a particular direction or to be in a particular position relative to the shelf. A payload may be loaded onto the vehicle from the shelf. Subsequently, the human operator may use guided navigation instructions to move the vehicle from the first location to a second location associated with a machine. The operator may guide the vehicle to approach the machine from particular direction or to be in a particular position relative to the machine. The payload may be unloaded from the vehicle for use with the machine.

In the above example, the navigation steps may include all of the navigation instructions as indicated by the human operator as well as any autonomous navigation steps implemented by the vehicle's control system. However, some of the navigation steps may be redundant, irrelevant, or sub-optimal with regards to the purpose of having the vehicle pick up a payload at the shelf and deliver it to the machine. For example, the starting point of the vehicle and the navigation steps leading to the first location may not be relevant. However, the first location, its association with the shelf, the direction of approach, the vehicle's position, and the fact that the payload is being loaded on the vehicle may be relevant. Thus, the derived tasks may include: go to the first location; approach from a particular direction; orient to the shelf with a particular position; and wait for a predetermined time or until a signal is received to indicate that the payload has been loaded before continuing. Similarly, the particular guided navigation steps to the second location may not be particularly relevant, whereas the second location itself (and associated details may be).

At step 716, a recipe is generated based on the navigation steps and/or the derived tasks. The recipe may be generated by one or both of the vehicle's control system and the graphical user-interface device. According to some embodiments, the recipe may be generated as a result of input received by a human operator with the graphical user-interface device. According to some embodiments, the recipe may be presented to the human operator in a human-readable form so that the human operator can edit or supplement the recipe, for example, by defining waypoints for use in the recipe.

At step 718, the recipe is stored. The recipe may be stored in a computer-readable medium on one or both of the vehicle's control system and the graphical user-interface device. As such, the recipe can be made available for future use by the vehicle.

At step 720, the recipe may be shared by the vehicle. For example, the vehicle and/or the graphical user-interface device may retrieve the recipe from the medium, and transmit the recipe to a fleet-management system, and/or directly to another vehicle. According to some embodiments, it may be necessary to install other equipment in order to share the recipe. For example, in some cases, the vehicle may be used as a stand-alone self-driving vehicle operating independently of a fleet-management system in order to generate a recipe. Subsequently, a fleet of vehicles and a fleet-management system may be installed in the facility, and the recipe may be transmitted to the fleet-management system from the vehicle. In other cases, the recipe may be shared with the fleet-management system or another vehicle using removable non-transient computer-readable media. In this way, a stand-alone self-driving vehicle can be used to generate a recipe prior to other vehicles or a fleet-management system being installed in the facility.

Figure 8:
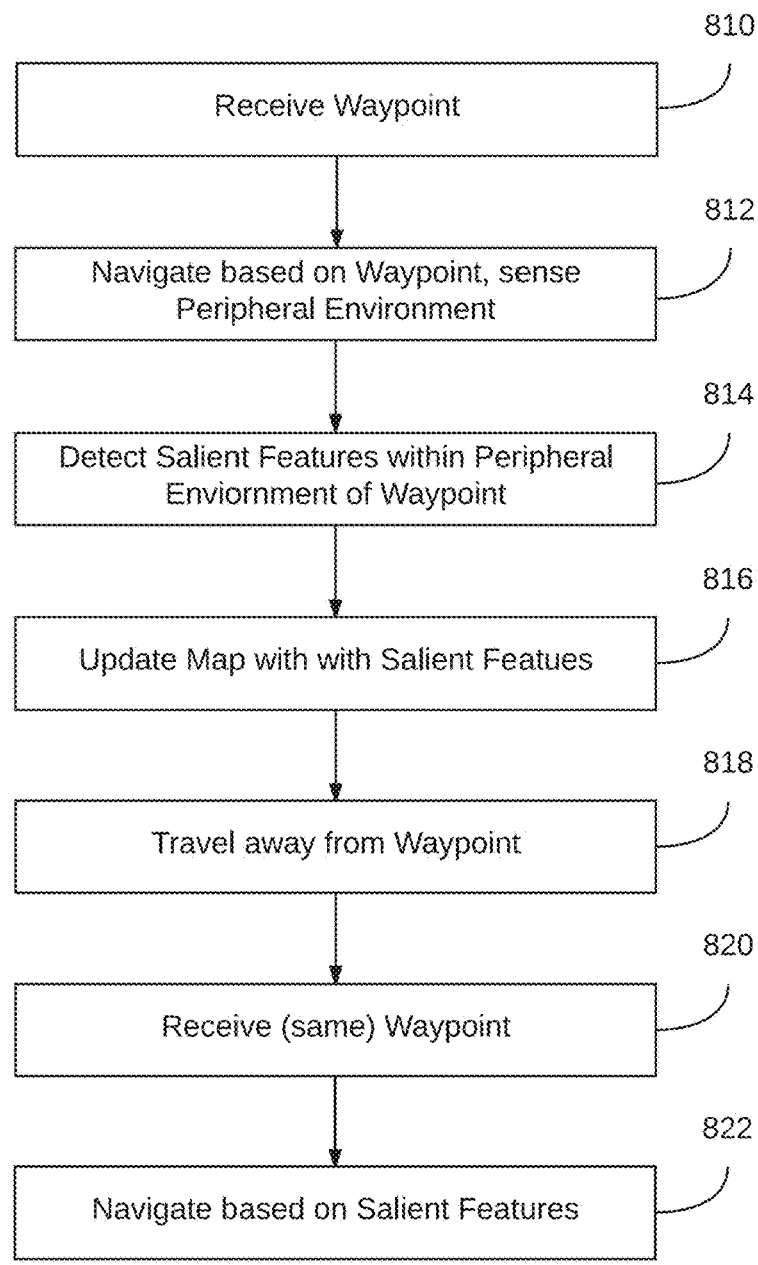
FIG. 8 depicts a method of instructing a self-driving vehicle in an industrial facility according to a non-limiting embodiment.

Referring to FIG. 8, there is shown a method 800 of instructing a self-driving vehicle in an industrial facility according to a non-limiting embodiment. According to some embodiments, the method 800 may executed using a stand-alone self-driving vehicle with a graphical user-interface device.

The method 800 begins at step 810 when a waypoint is received. The waypoint may be received by the vehicles control system from the graphical user-interface device as indicated by a human operator relative to a graphical map. According to some embodiments the waypoint may be received by the vehicle's control system from the graphical user interface device as selected by a human operator from a list of available waypoints. According to other embodiments a graphical user-interface device may not be available or present, and the waypoint may be received from a fleet-management system.

At step 812, the vehicle navigates based on the location of the waypoint relative to the map stored in the vehicle's control system. Any navigation mode may be used, such as autonomous, semi-autonomous, and guided-autonomous navigation modes. Generally, the vehicle may sense its peripheral environment for features, using the vehicle's sensor system, and update the map accordingly, as previous described.

At step 814, when the waypoint location is within the peripheral environment of the vehicle, the vehicle senses salient features within the peripheral environment of the waypoint. For example, if the waypoint is associated with a particular target such as a vehicle docking station, payload pick-up and drop-off stand, shelf, machine, etc., then the salient features may be particular features associated with the target. In this case, the salient feature may be a feature of the target itself (e.g. based on the target's geometry), or the salient feature may be a feature of another object in the periphery of the target.

According to some embodiments, an image of the salient feature may be stored on the vehicle's control system as a signature or template image for future use.

At step 816, the map stored on the vehicle's control system is updated to include the salient feature or identifying information pertaining to the salient feature. The salient feature may be associated with the waypoint.

Subsequent to step 816, the vehicle may leave the area of the waypoint and conduct any number of other tasks and missions. Generally, this involves the vehicle travelling away from the waypoint at step 818.

At some future time, the vehicle may be directed back to the waypoint (i.e. the same waypoint as in 810). However, in this case, since there is now a salient feature associated with the waypoint, rather than navigating specifically based on the waypoint, the vehicle's control system autonomously navigates in part or in whole based on the salient features associated with the waypoint.

The scope of the claims should not be limited by the embodiments set forth in the above examples, but should be given the broadest interpretation consistent with the description as a whole.

We claim:

1. A method for operating one or more self-driving vehicles in an industrial facility for completing at least one recurring task, the method comprising:
    operating a self-driving vehicle of the one or more self-driving vehicles, in one of a semi-autonomous mode and a guided mode, to complete one or more tasks that involve operating the self-driving vehicle to engage a feature location in the industrial facility,
    wherein in the semi-autonomous mode, the self-driving vehicle is operated based on control instructions received from both user inputs and a control system of the self-driving vehicle, and in the guided mode, the self-driving vehicle is operated based on control instructions received only from user inputs;
    during operation of the self-driving vehicle, recording the control instructions received in respect of the one or more tasks;
    determining, based at least on the feature location and one or more characteristics of the one or more tasks, that the one or more tasks comprises the at least one recurring task for the one or more self-driving vehicles;
    in response to determining that the one or more tasks comprise the at least one recurring task, generating a recipe that can be used by the one or more self-driving vehicles for subsequent operation to complete the at least one recurring task, the recipe comprising a subset of the user-provided control instructions and corresponding to a reduced amount of user-provided control instructions, wherein the recipe is generated by:
        deriving one or more task instructions from the recorded control instructions to identify user-provided control instructions necessary for engaging the feature location;
        evaluating the recorded control instructions to identify one or more redundant control instructions which comprise navigation instructions that can be autonomously generated by the self-driving vehicle when executing the one or more task, instructions during the subsequent operation; and
        generating the recipe to include the one or more task instructions while excluding the one or more redundant control instructions; and
    at a subsequent time, autonomously operating at least one of the one or more self-driving vehicles to complete the at least one recurring task according to the recipe and one or more navigation instructions autonomously generated in accordance with the recipe.

2. The method of claim 1, wherein the one or more tasks involve operating the self-driving vehicle to navigate to one or more locations within the facility, and the control instructions comprise navigation instructions for navigating the self-driving vehicle towards the one or more locations.

3. The method of claim 2, further comprising:
    sensing a salient feature at at least one of the one or more locations using a sensor system of the self-driving vehicle;
    storing an image of the salient feature in association with the at least one location; and
    to complete the at least one recurring task at the subsequent time, navigating the at least one of the one or more self-driving vehicles to the at least one location in part based on the image.

4. The method of claim 1, wherein engaging the feature location includes operating the self-driving vehicle to interact with a feature at the feature location, and the control instructions comprise one or more of: a direction of approach of the self-driving vehicle towards the feature, the self-driving vehicle's position relative to the feature upon arriving at the feature location, and an action performed by the self-driving vehicle in association with the feature.

5. The method of claim 1, wherein the at least one of the one or more self-driving vehicles comprises one or more of:
    the self-driving vehicle; and
    a second self-driving vehicle, and the method further comprises transmitting the recipe to the second self-driving vehicle.

6. The method of claim 5, wherein transmitting the recipe to the second self-driving vehicle comprises transmitting the recipe to a fleet-management system, and subsequently transmitting the recipe from the fleet-management system to the second self-driving vehicle.

7. The method of claim 1, wherein the one or more redundant control instructions excluded from the recipe include control instructions related to navigation instructions for a path portion that is traversed at the subsequent time by the at least one of the one or more self-driving vehicles to complete the one or more tasks based on the recipe.

8. The method of claim 1, wherein operating the self-driving vehicle to complete the one or more tasks further comprises operating the self-driving vehicle to map the facility, wherein the mapping comprises:
    identifying an electronic map stored in a non-transient computer-readable medium of the self-driving vehicle, wherein the electronic map comprises a mapped area and an unmapped area separated from the mapped area by a boundary edge;

determining, based on a current location of the self-driving vehicle and the electronic map, whether the self-driving vehicle is within the mapped area;

in response to determining that the self-driving vehicle is within the mapped area, navigating the self-driving vehicle to a goal located within the unmapped area, wherein navigating the self-driving vehicle to the goal located within the unmapped area comprises:

operating the self-driving vehicle in an autonomous mode up to the boundary edge, wherein during operation in the autonomous mode, the control system of the self-driving vehicle autonomously operates a drive system of the self-driving vehicle to follow a path;

upon arrival at the boundary edge, switching the self-driving vehicle into the semi-autonomous mode to sense features within the unmapped area while navigating towards the goal;

while operating in the semi-autonomous mode, operating a sensor system of the self-driving vehicle to sense one or more features of the facility at a location in the unmapped area; and updating the electronic map to include the one or more features within the unmapped area.

9. The method of claim 8, wherein the self-driving vehicle autonomously navigates to perform the one or more tasks based on the updated electronic map.

10. A system for operating self-driving vehicles in an industrial facility for completing at least one recurring task, the system comprising:

a self-driving vehicle comprising a drive system for moving the self-driving vehicle, and a control system for controlling the drive system wherein the control system comprises a non-transient computer-readable medium, wherein the control system of the self-driving vehicle being configured for:

operating the drive system, in one of a semi-autonomous mode and a guided mode, to complete one or more tasks that involve operating the self-driving vehicle to engage a feature location in the industrial facility, wherein in the semi-autonomous mode, the drive system is operated based on control instructions received from both user inputs and the control system, and in the guided mode, the drive system is operated based on control instructions received only from user inputs;

during operation of the drive system, recording the control instructions received in respect of the one or more tasks;

determining, based at least on the feature location and one or more characteristics of the one or more tasks, that the one or more tasks comprises the at least one recurring task for the one or more self-driving vehicles;

in response to determining that the one or more tasks comprises the at least one recurring task, generating a recipe that can be used by the one or more self-driving vehicles for subsequent operation to complete the at least one recurring task, the recipe comprising a subset of the user-provided control instructions and corresponding to a reduced amount of user-provided control instructions, wherein the recipe is generated by:

deriving one or more task instructions from the recorded control instructions to identify user-provided control instructions necessary for engaging the feature location;

evaluating the recorded control instructions to identify one or more redundant control instructions which comprises navigation instructions that can be autonomously generated by the self-driving vehicle when executing the one or more task instructions during the subsequent operation; and generating the recipe to include the one or more task instructions while excluding the one or more redundant control instructions; and at a subsequent time, autonomously operating the drive system to complete the at least one recurring task according to the recipe and one or more navigation instructions autonomously generated in accordance with the recipe.

11. The system for operating self-driving vehicles of claim 10, wherein the one or more tasks involve operating the drive system to navigate to one or more locations within the facility, and the control instructions comprise navigation instructions for navigating the self-driving vehicle towards the one or more locations.

12. The system for operating self-driving vehicles of claim 11, wherein the self-driving vehicle further comprises a sensor system, and the control system is further configured for:

sensing a salient feature at at least one of the one or more locations using the sensor system;

storing, in the non-transient computer-readable medium, an image of the salient feature in association with the at least one location; and to complete the at least one recurring task at the subsequent time, navigating the at least one self-driving vehicle to the at least one location in part based on the image.

13. The system for operating self-driving vehicles of claim 10, wherein engaging the feature location includes operating the self-driving vehicle to interact with a feature at the feature location, and the control instructions comprise one or more of: a direction of approach of the self-driving vehicle towards the feature, the self-driving vehicle's position relative to the feature upon arriving at the feature location, and an action performed by the self-driving vehicle in association with the feature.

14. The system for operating self-driving vehicles of claim 10, wherein the system further comprises a second self-driving vehicle, and the control system of the second vehicle being configured for:

receiving the recipe; and autonomously operating a drive system of the second self-driving vehicle to complete the one or more tasks based on the recipe.

15. The system for operating self-driving vehicles of claim 14, wherein the system further comprises a fleet-management system which receives the recipe from the self-driving vehicle, and transmits the recipe to the second self-driving vehicle.

16. The system for operating self-driving vehicles of claim 10, wherein the one or more redundant control instructions excluded from the recipe include control instructions related to navigation instructions for a path portion that is traversed at the subsequent time to complete the one or more tasks based on the recipe.

17. The system for operating self-driving vehicles of claim 10, wherein the self-driving vehicle further comprises a sensor system, and operating the self-driving vehicle to complete the one or more tasks further comprises operating the self-driving vehicle to map the facility, and wherein the mapping comprises the control system being further configured for:

identifying an electronic map stored in the non-transient computer-readable medium of the self-driving vehicle, wherein the electronic map comprises a mapped area and an unmapped area separated from the mapped area by a boundary edge;

determining, based on a current location of the self-driving vehicle and the electronic map, whether the self-driving vehicle is within the mapped area;

in response to determining that the self-driving vehicle is within the mapped area, navigating the self-driving vehicle to a goal located within the unmapped area, wherein navigating the self-driving vehicle to the goal located within the unmapped area comprises:

operating the drive system in an autonomous mode up to the boundary edge, wherein during operation in the autonomous mode, the control system of the self-driving vehicle autonomously operates the drive system of the self-driving vehicle to follow a path;

upon arrival at the boundary edge, switching the self-driving vehicle into the semi-autonomous mode to sense features within the unmapped area while navigating towards the goal;

while operating in the semi-autonomous mode, operating the sensor system to sense one or more features of the facility at a location in the unmapped area; and updating the electronic map to include the one or more features within the unmapped area.

18. The system for operating self-driving vehicles of claim 17, wherein the self-driving vehicle autonomously navigates to perform the one or more tasks based on the updated electronic map.

* * * * *